(12) United States Patent
Ford et al.

(10) Patent No.: US 10,894,672 B2
(45) Date of Patent: Jan. 19, 2021

(54) CONTINUOUS MOTION PACKAGING MACHINE WITH ROTATING FLIGHTS

(71) Applicant: Graphic Packaging International, LLC, Atlanta, GA (US)

(72) Inventors: Colin P. Ford, Woodstock, GA (US); Robert Harold Irvine, Nisswa, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 190 days.

(21) Appl. No.: 16/021,785

(22) Filed: Jun. 28, 2018

(65) Prior Publication Data

US 2018/0305136 A1 Oct. 25, 2018

Related U.S. Application Data

(62) Division of application No. 14/752,085, filed on Jun. 26, 2015, now Pat. No. 10,035,663.
(Continued)

(51) Int. Cl.
*B65G 47/244* (2006.01)
*B65B 43/52* (2006.01)
(Continued)

(52) U.S. Cl.
CPC .......... *B65G 47/244* (2013.01); *B65B 11/004* (2013.01); *B65B 11/105* (2013.01);
(Continued)

(58) Field of Classification Search
CPC ......... B65B 5/024; B65B 5/06; B65B 11/004; B65B 11/10; B65B 11/105; B65B 11/08;
(Continued)

(56) References Cited

U.S. PATENT DOCUMENTS 2,650,746 A 9/1953 Rideout et al.
3,189,158 A 6/1965 Lucas
(Continued)

FOREIGN PATENT DOCUMENTS

EP 623 511 B1 6/1997
EP 660 788 B1 7/1997
(Continued)

OTHER PUBLICATIONS

International Search Report and Written Opinion for PCT/US2015/038033 dated Sep. 24, 2015.
(Continued)

*Primary Examiner* — Chelsea E Stinson
*Assistant Examiner* — Himchan Song
(74) *Attorney, Agent, or Firm* — Womble Bond Dickinson (US) LLP

(57) ABSTRACT

A packaging machine for placing articles into a carton includes rotating flight assemblies that receive a carton or carton blank, and rotate the carton blank and carton with articles while the flight assemblies move downstream. The flight assemblies each include two fixed segments and one segment that includes a block and associated bracket that rotate as the flight assembly is pulled through the machine by a conveying system. A method includes carton blanks being fed by a carton feeder onto the flight assemblies. Articles are formed into an article group, which is then placed onto a carton blank. As the blank and article group move in a downstream direction, the side panels of the carton blank are wrapped around the article group and the carton and article group are rotated to assist in closing the carton end flaps.

19 Claims, 19 Drawing Sheets

Related U.S. Application Data

(60) Provisional application No. 61/998,453, filed on Jun. 27, 2014.

(51) Int. Cl.

| | | |
|---|---|---|
| *B65G 17/18* | (2006.01) | |
| *B65B 49/14* | (2006.01) | |
| *B65B 11/00* | (2006.01) | |
| *B65B 11/10* | (2006.01) | |
| *B65B 11/12* | (2006.01) | |
| *B65B 43/12* | (2006.01) | |
| *B65B 5/02* | (2006.01) | |
| *B65B 7/20* | (2006.01) | |

(52) U.S. Cl.
CPC .............. *B65B 11/12* (2013.01); *B65B 43/52* (2013.01); *B65B 49/14* (2013.01); *B65G 17/18* (2013.01); *B65B 5/024* (2013.01); *B65B 7/20* (2013.01); *B65B 43/126* (2013.01)

(58) Field of Classification Search
CPC ..... B65B 43/10; B65B 43/126; B65B 43/265; B65G 47/244; B65G 17/18
USPC ......... 53/443, 448, 456, 458, 461, 543, 564, 53/566, 209; 198/375, 377.1, 474.1
See application file for complete search history.

(56) References Cited

U.S. PATENT DOCUMENTS

| | | | |
|---|---|---|---|
| 3,366,221 A * | 1/1968 | Preisig | B65H 29/00 |
| | | | 198/377.04 |
| 4,810,238 A | 3/1989 | Pazdernik | |
| 4,878,337 A | 11/1989 | Raudat et al. | |
| 5,181,598 A | 1/1993 | Lashyro | |
| 5,185,984 A * | 2/1993 | Tisma | B65B 59/005 |
| | | | 53/252 |
| 5,360,099 A | 11/1994 | Culpepper et al. | |
| 5,430,992 A | 7/1995 | Olson | |
| 5,656,007 A | 8/1997 | Olson et al. | |
| 5,724,785 A | 3/1998 | Malanowski | |
| 5,771,658 A | 6/1998 | Olson et al. | |
| 5,809,746 A | 9/1998 | DePuy | |
| 5,904,026 A | 5/1999 | Irvine | |
| 5,911,303 A | 6/1999 | Malanowski | |
| 5,979,147 A | 11/1999 | Reuteler | |
| 6,058,679 A * | 5/2000 | Ziegler | B65B 5/024 |
| | | | 53/447 |
| 6,279,301 B1 * | 8/2001 | Corniani | B65B 21/24 |
| | | | 493/80 |
| 6,308,816 B1 | 10/2001 | Bankuty | |
| 6,374,997 B1 | 4/2002 | Spadafora | |
| 6,390,276 B1 * | 5/2002 | Haug | B65B 5/06 |
| | | | 198/377.01 |
| 6,435,332 B1 * | 8/2002 | Price | B65G 47/244 |
| | | | 198/375 |
| 6,520,314 B1 | 2/2003 | Seiling | |
| 7,025,192 B2 | 4/2006 | Hoeg | |
| 7,695,421 B2 | 4/2010 | Ford | |
| 8,015,776 B2 | 9/2011 | Alfonso et al. | |
| 8,127,518 B2 | 3/2012 | Ford | |
| 8,672,822 B2 | 3/2014 | Walsh et al. | |
| 8,783,000 B2 | 7/2014 | Wintring | |
| 9,021,773 B2 | 5/2015 | Ford | |
| 9,085,421 B2 | 7/2015 | Ford | |
| 9,174,753 B2 | 11/2015 | Cain | |
| 9,238,558 B2 | 1/2016 | Houck et al. | |
| 9,365,358 B2 | 6/2016 | Barber et al. | |
| 10,035,663 B2 | 7/2018 | Ford et al. | |
| 2007/0147981 A1 | 6/2007 | Moncrief et al. | |
| 2007/0277480 A1 * | 12/2007 | Ford | B65B 11/105 |
| | | | 53/443 |
| 2009/0084075 A1 | 4/2009 | May et al. | |
| 2010/0077705 A1 * | 4/2010 | Wintring | B65G 17/34 |
| | | | 53/475 |
| 2010/0256655 A1 | 10/2010 | Rovers | |
| 2013/0064636 A1 | 3/2013 | Karst | |
| 2014/0174883 A1 | 6/2014 | Papsdorf | |
| 2015/0375880 A1 * | 12/2015 | Ford | B65B 49/14 |
| | | | 53/443 |

FOREIGN PATENT DOCUMENTS

| | | |
|---|---|---|
| EP | 686 118 B1 | 5/1998 |
| EP | 717 702 61 | 12/1998 |
| EP | 758 975 61 | 3/1999 |
| EP | 782 958 B1 | 5/1999 |
| EP | 665 797 B1 | 12/2000 |
| EP | 717 700 B1 | 2/2002 |
| EP | 715 596 B1 | 2/2003 |
| EP | 767 736 B1 | 5/2004 |
| EP | 2 027 021 B1 | 12/2010 |
| EP | 2 190 759 B1 | 8/2013 |
| EP | 2 024 234 B1 | 10/2013 |
| EP | 2 703 314 A1 | 3/2014 |
| EP | 2 345 590 B2 | 7/2016 |
| EP | 3 053 832 A1 | 8/2016 |
| EP | 2 744 712 B1 | 10/2016 |
| WO | WO 97/23386 | 7/1997 |
| WO | WO 97/23395 | 7/1997 |
| WO | WO 97/46449 | 12/1997 |
| WO | WO 97/46450 | 12/1997 |
| WO | WO 97/46451 | 12/1997 |
| WO | WO 97/46452 | 12/1997 |
| WO | WO 97/47524 | 12/1997 |
| WO | WO 98/03399 | 1/1998 |
| WO | WO 98/28209 | 7/1998 |
| WO | WO 99/28191 | 6/1999 |
| WO | WO 2013/005120 A1 | 1/2013 |
| WO | WO 2014/172409 A1 | 10/2014 |
| WO | WO 2015/200818 A1 | 12/2015 |

OTHER PUBLICATIONS

Supplementary European Search Repot for EP 15 81 1021 dated Dec. 12, 2017.
Office Action for U.S. Appl. No. 14/752,085 dated Nov. 2, 2017.
Response to Restriction Requirement for U.S. Appl. No. 14/752,085 dated Nov. 20, 2017.
Office Action for U.S. Appl. No. 14/752,085 dated Dec. 13, 2017.
Amendment A and Response to Office Action for U.S. Appl. No. 14/752,085 dated Jan. 19, 2018.
Notice of Allowance and Fee(s) Due for U.S. Appl. No. 14/752,085 dated Mar. 29, 2018.
Issue Fee Transmittal Form for U.S. Appl. No. 14/752,085 dated Jun. 28, 2018.
Issue Notification for U.S. Appl. No. 14/752,085 dated Jul. 11, 2018.

* cited by examiner

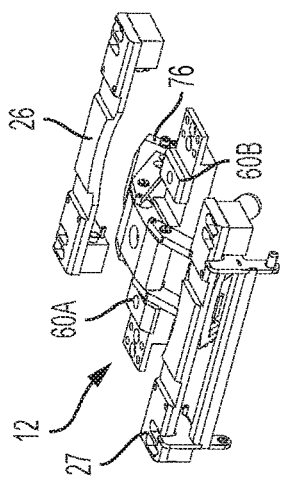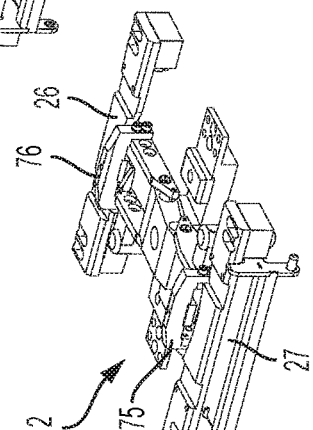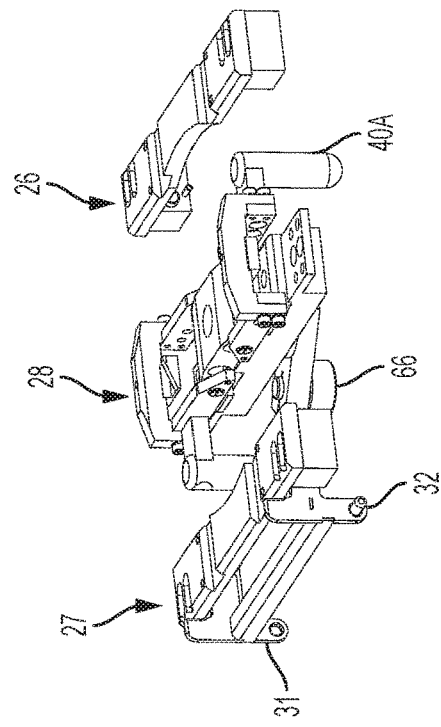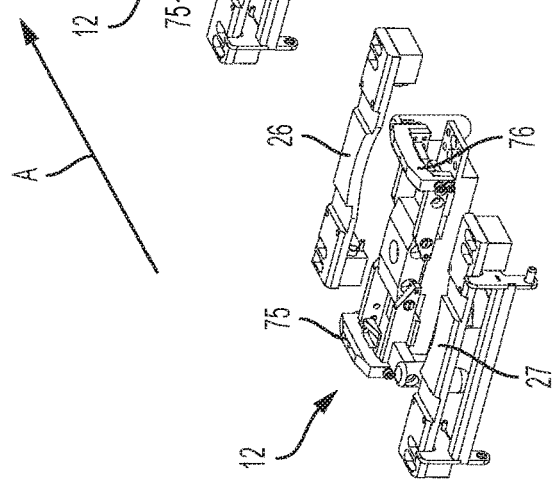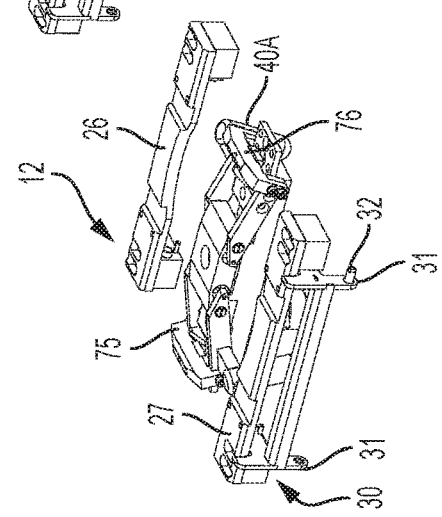

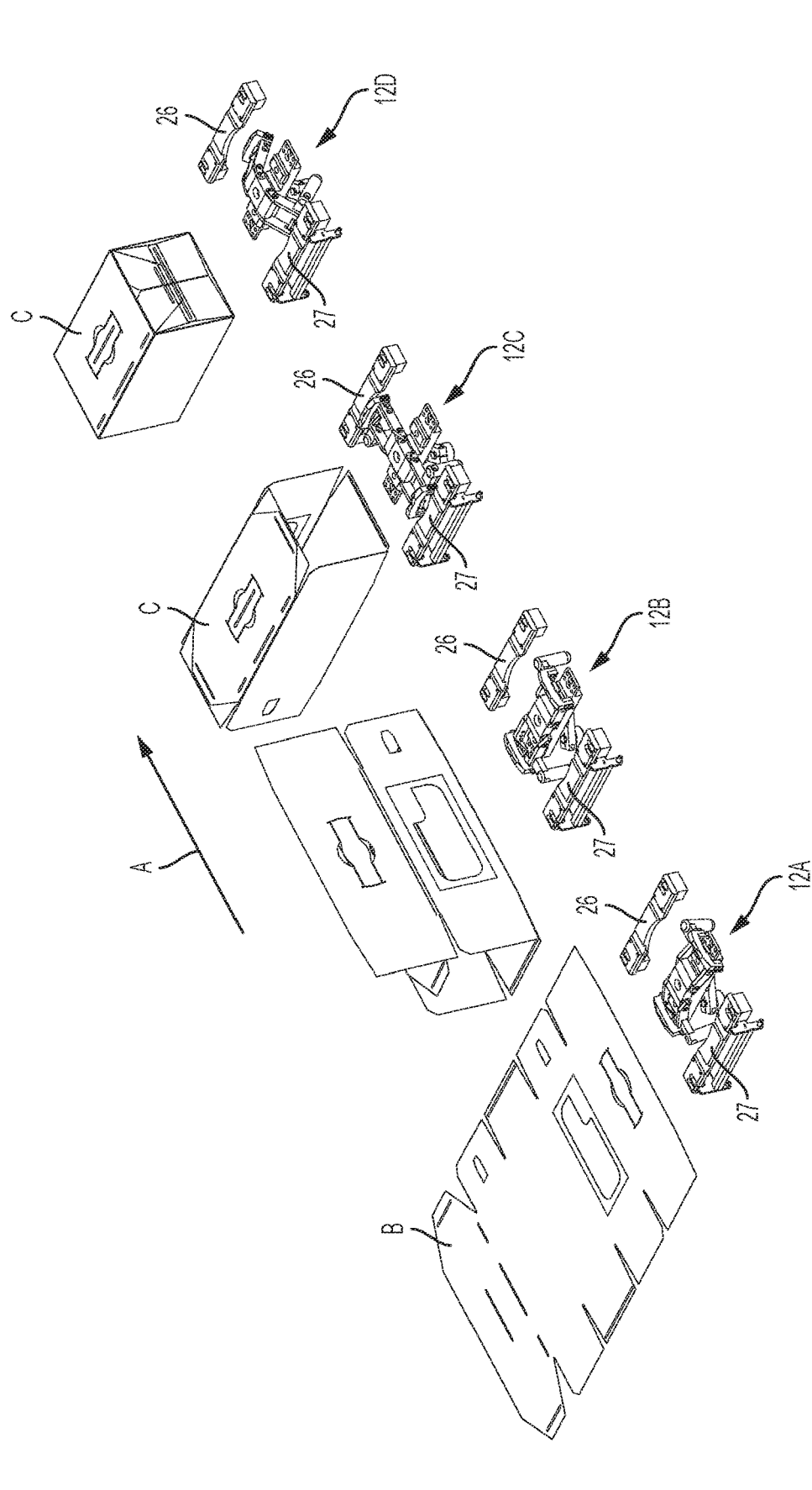

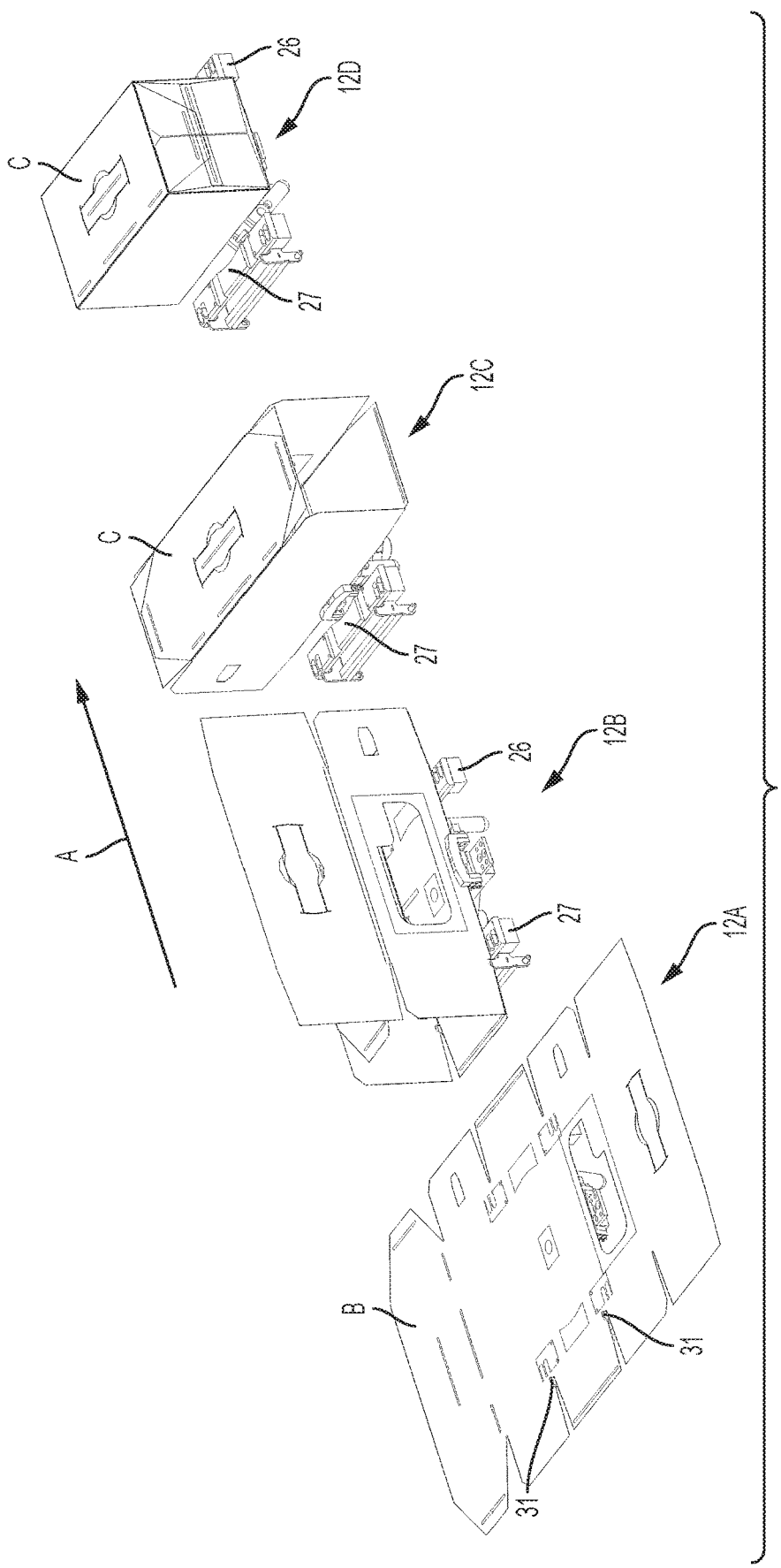

CONTINUOUS MOTION PACKAGING MACHINE WITH ROTATING FLIGHTS

CROSS-REFERENCE TO RELATED APPLICATION

This application is a divisional application of U.S. patent application Ser. No. 14/752,085, filed Jun. 26, 2015, which claims the benefit of U.S. Provisional Patent Application No. 61/998,453, filed Jun. 27, 2014.

INCORPORATION BY REFERENCE

The disclosures of U.S. patent application Ser. No. 14/752,085, which was filed on Jun. 26, 2015, and U.S. Provisional Patent Application No. 61/998,453, which was filed on Jun. 27, 2014, are hereby incorporated by reference for all purposes as if presented herein in their entirety.

BACKGROUND OF THE INVENTION

Continuous motion packaging machines for placing articles into cartons are well known, and include numerous features, for example, components to sort and accumulate articles, such as beverage containers, and to place the articles into various types of cartons. Typical such machines include a main conveyor having spaced lugs or flights to move an article group or a carton, or both, from an intake end to a discharge end, along a path of travel. Other machines place a preformed group of articles onto a carton blank, which is then folded around the group. The articulating or rotating flights described herein are shown incorporated into a packaging machine adapted to wrap an article group with a paperboard carton blank, to form a fully wrapped, fully enclosed and sealed carton containing the article group. Some of these wrap-type cartons are referred to as "sleeve" cartons, some are wrapped around the bottle group from above the group, while still others place the bottle group onto a carton blank, and then wrap the blank over and around the group. If the carton is fully enclosed, the machine includes a rotating tucker or a static tucker plate or bar, to move the previously glued end flaps to the carton. Other wrap-type cartons either fully enclosed or partially enclosed can be formed with these machines.

A principal feature of known packaging machines is that they are designed to run continuously when packaging articles. All of the main functions of the machine perform their respective functions as concurrently as possible, so that the output of the machine is at an optimum capacity. These include inputting the articles, such as bottles, cans, juice or milk boxes, etc., forming the desired article group, feeding a carton blank or partially formed carton sleeve onto a conveyor, and placing the article group within the sleeve or upon the flat blank then wrapping the blank up and around the group, or wrapping the blank around the bottom group from above. In machines that wrap a flat blank around a formed article group that rests upon the carton blank, the process includes folding the main panels of the blank around the group, which are sealed together, typically with glue, and then sealing the minor end flaps, which, up to this point, are open. These minor flaps typically also are glued, entirely sealing the carton. Finally the filled and fully sealed carton is discharged at the downstream end of the packaging machine. In some known machines that close the carton end flaps to form a fully enclosed carton, a mechanism exists to rotate the partially enclosed carton sleeve so that the end flaps encounter a rotary tucker wheel or a static tucker bar or plate. Sometimes this is accomplished by a separate mechanism that engages the carton from above, or the carton can be transferred to a separate conveyor that is adapted to rotate the carton to engage the tucker.

Although the present invention can be adapted to be utilized with various types of cartons, including basket cartons, where rotation of the carton along the main conveyor is necessary, for the purposes of illustration the rotating flight assembly of the present invention is used in a continuous motion packaging machine that places articles into a wrap-type carton blank, and then wraps the blank up and around the article group. The partially formed cartons or unformed (flat) carton blanks are sequentially fed by a carton feeder, also well known, onto each of the sequential, spaced flight assemblies that are pulled along a downstream path by a flight conveyor. While some wrap-type cartons are partially formed by pre-gluing two side panels and forming a sleeve prior to placement of the sleeve onto the conveyor by a carton feeder, the present machine depicts inputting flat paperboard carton blanks by a carton feeder (not shown) onto each flight assembly. Whether the machine accepts partially formed sleeves or flat carton blanks onto the main conveyor, additional components are included at the proper location along the flight conveyor to place glue onto selected locations of the carton end flaps, and then to move the carton end flaps into a closed position. These gluing and closure components also are well known. As referenced above, these closure components, for example, can be rotating wheels or tuckers, or static bars and plates, sometimes referred to as "plows," that fold the carton panels and/or flaps by engaging them and pushing them into a closed position as they are moved downstream by the main conveyor. Sometimes compression belts also are used to press on the flaps and panels to ensure proper glue contact or to convey the articles that leave the main conveyor.

In known machines where it is necessary to turn or rotate the carton as it is being formed around the article group or after it contains the article group in order to properly position the flaps for closure, a separate conveyor/flight mechanism or other means is used to rotate the partially formed carton. This rotation assists in moving the remaining, unfolded flaps into a closed position by the separate flight mechanism and closure elements. Other rotating mechanisms are known in packaging machines. Such separate turning devices can have separate conveyors that must be timed specifically with the main conveyor. Otherwise jamming could result in a machine shutdown, with loss of efficiency and production.

SUMMARY OF THE INVENTION

The present invention is a packaging machine that utilizes a rotating flight assembly, preferably along its main conveyor. The invention also is the rotating flight assembly itself and a method of packaging article groups into a carton by rotating the article group and the carton with a rotating flight assembly that is underneath the carton. The invention includes a conveyor having a surface plate or bedplate, defining a cam track, and spaced flight assemblies riding on the surface plate and adjacent surfaces. The flight assemblies are pulled downstream from a tail gear along the cam track and bedplate toward a head gear by parallel chains connected to each end of the flight assembly and which run along opposing sides of the bedplate. Along this path of travel a flat carton blank, preferably made of paperboard, is placed upon each sequential, spaced flight assembly. A preformed article group then is placed on the carton blank, directly above the flight assembly by known article placement devices, and the main carton panels are glued and closed using any desirable folding element, such as a static plow or bar or a rotating tucker wheel. As the flight assemblies continue to be pulled along by the chain conveyor, each assembly, one at a time, is rotated ninety degrees at a specific location on the bedplate, which positions the ends or side walls of the partially formed carton to be placed for closure. Similarly, as the now rotated carton moves further downstream, glue is applied to the side flaps and then additional closure elements, such as static plows, bars or tuckers, including for example rotating wheels, press the flaps closed against other end flaps or against the main panels. After the carton is fully enclosed, the carton is moved off of the closure portion of the packaging machine, and the rotated flight assembly drops off the surface plate by turning around the head gear assembly. Side compression belts, for example, assume movement of the now fully filled and closed carton off of the conveyor and onto a carton collection area. The sequential flight assemblies are moved under the surface plate, toward the tail gear assembly, where the process is repeated.

BRIEF DESCRIPTION OF THE DRAWINGS

FIGS. 9A-9E show five isolated views of the flight assembly of the present invention, with the middle support plate in different positions.

FIG. 16 is an isolated view of the carton blank and carton in stages of assembly, positioned over respective flight assemblies of the present invention.

FIG. 17 is an isolated view of the carton blank and carton in stages of assembly, positioned on top of an contacting respective flight assemblies of the present invention.

DETAILED DESCRIPTION OF THE PREFERRED EMBODIMENTS

Figure 1:
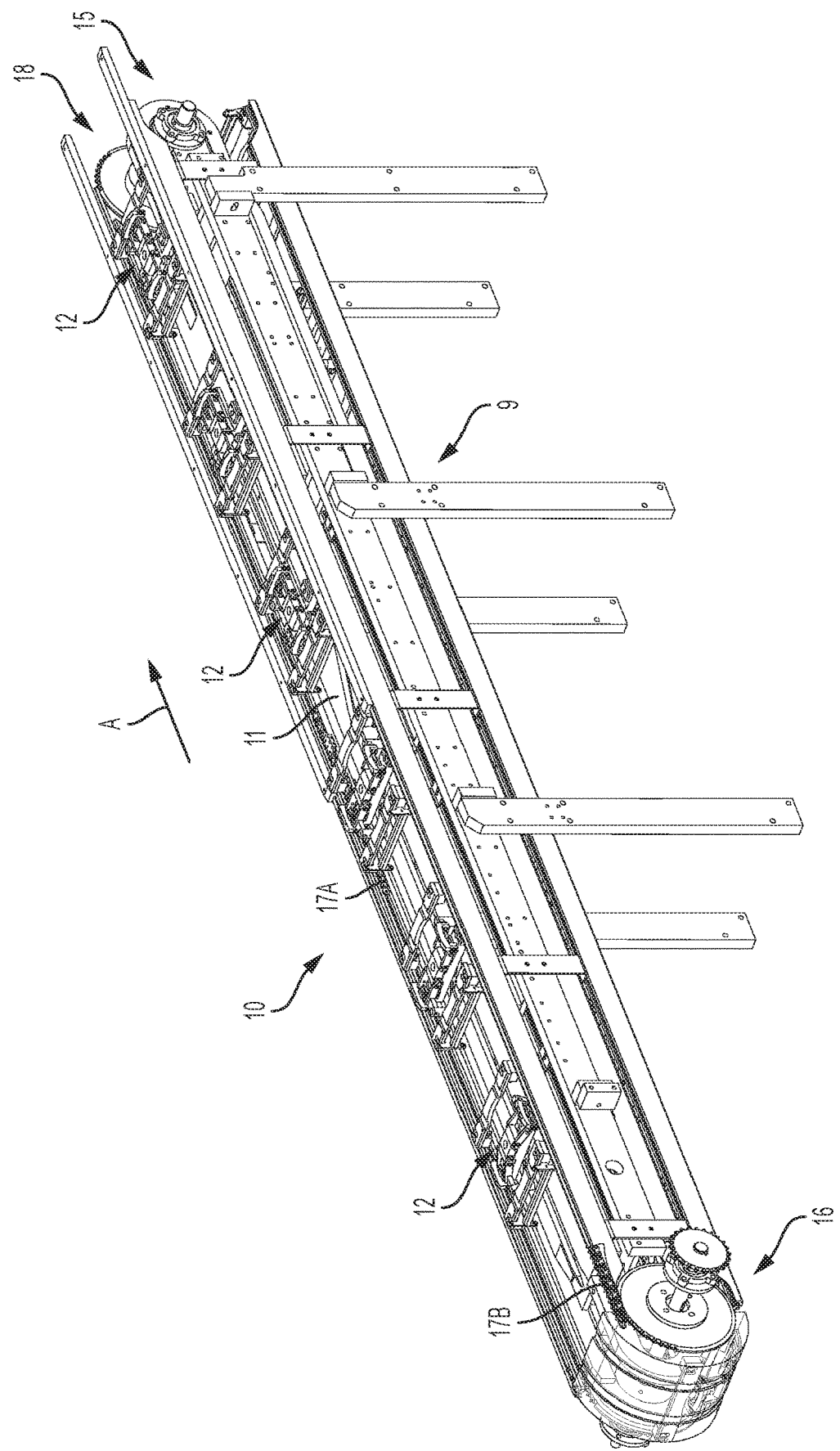
FIG. 1 is a perspective view of a portion of a continuous motion packaging machine in accordance with the present invention.

FIG. 1 shows a portion of the main conveyor of a packaging machine 10 having a frame 9 that supports a surface plate 11 and rotating flight assemblies 12 of the present invention. The well known components of such continuous motion packaging machines, such as a carton feeder, article grouping and infeed assembly and static or rotating tuckers are not shown. Each of these components is well known, and various different types of such components can be used to accomplish carton feeding, article feeding and panel or flap closure. The packaging machine 10 includes a head gear assembly 15 and a tail gear assembly 16 that pull parallel chains 17A and 17B in the direction of the head gear assembly. These parallel chains form a chain conveyor 18.

Figure 2:
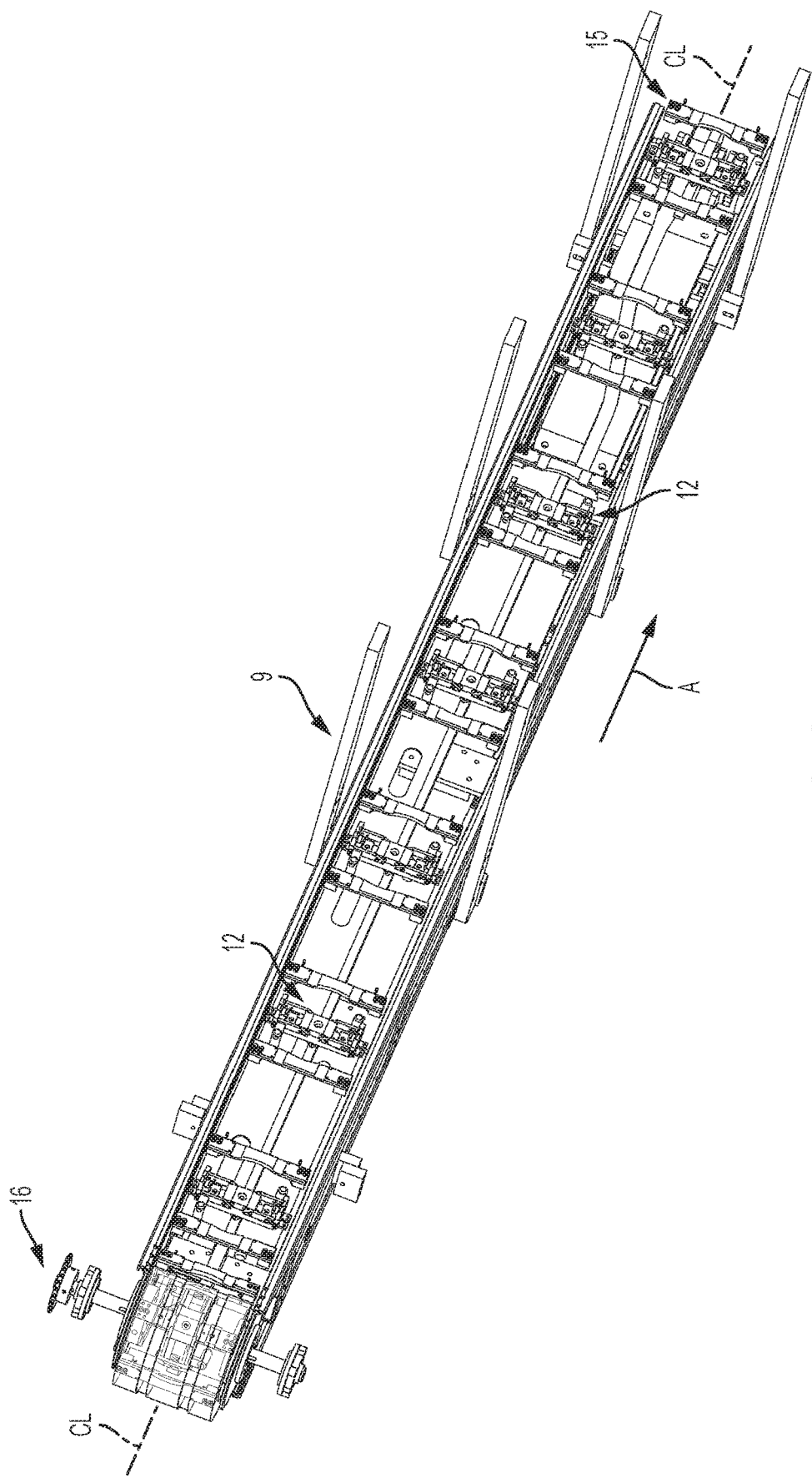
FIG. 2 is a perspective bottom view of the packaging machine of FIG. 1.
Figure 19:
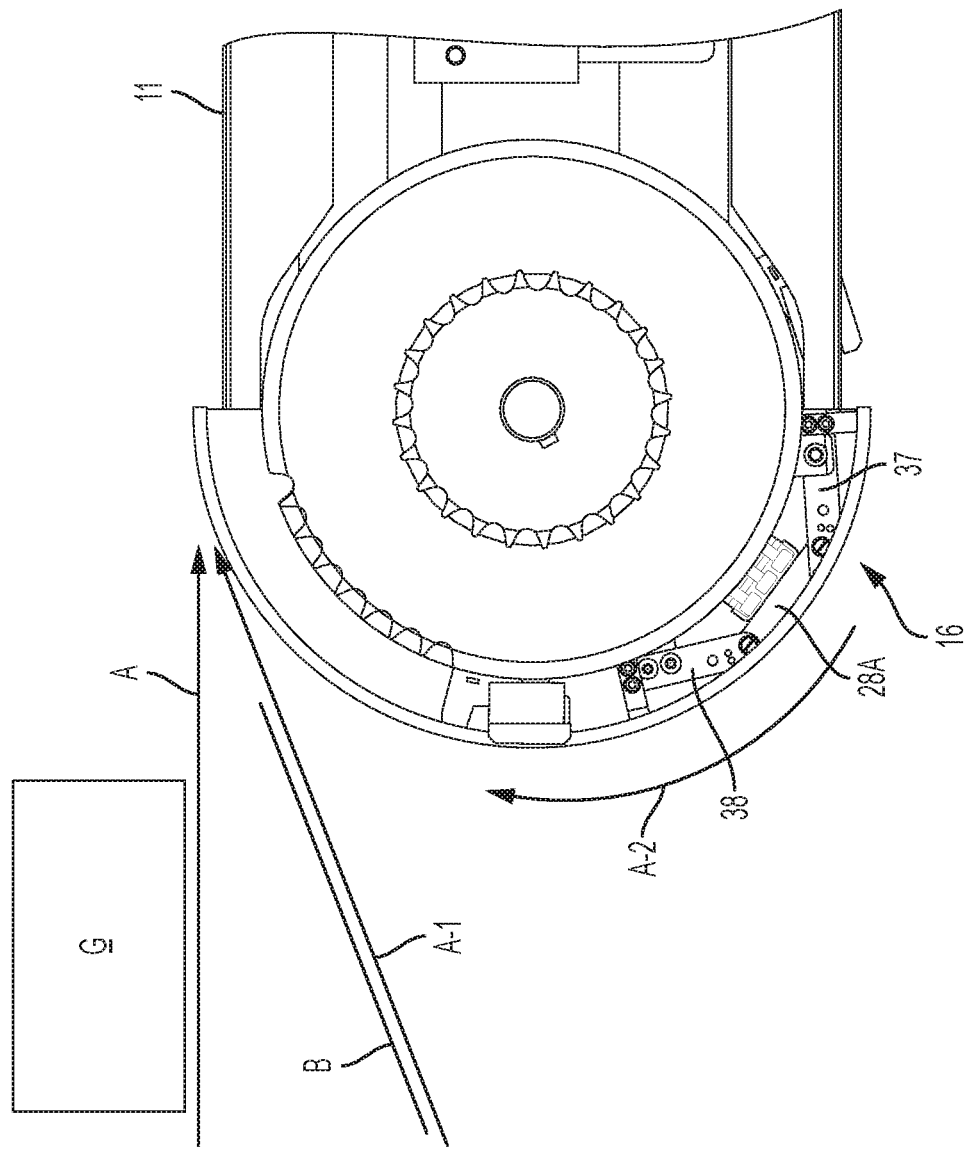
FIG. 19 is a side elevational view of a flight assembly of the present invention moving around the tail gear assembly of the packaging machine of FIG. 1.

The packaging machine 10 includes rotating flight assemblies 12, spaced along the chain conveyor 18. These flight assemblies 12 each are adapted to support a flat carton blank B (FIG. 17) and move the blank toward head gear assembly 15 in the downstream direction indicated by arrow A, of the packaging machine. The flight assemblies are spaced from one another at a distance that will allow for the timing of the various functions, such as carton blank placement, article group loading onto the carton blank, and panel folding around the article group, as is well known. The articles can be various types of articles, such as beverage bottles, cans, paperboard or plastic beverage containers or any type of similar article. Other spacing and flight speeds can be utilized depending upon well-known machine operation parameters. Each flight assembly 12 is pulled in the downstream direction of arrow A, around head gear assembly 15 and underneath surface plate 11, and back toward the tail gear assembly 16, as is shown in FIGS. 1 and 2. The respective flight assemblies 12 then move around tail gear assembly 16 (FIG. 19) and once again begin travel across plate 11 in the downstream direction of arrow A. In FIG. 19, an article group G is being fed in the downstream direction of arrow A. A carton blank B also is being fed in the downstream direction by any suitable, well known carton blank feeders (not shown). Tail gear assembly 16 is rotating in the direction of arrow A-2, and a flight assembly 12 is shown in its position as it is pulled by chain conveyor 18 over tail gear assembly 16.

Figure 3:
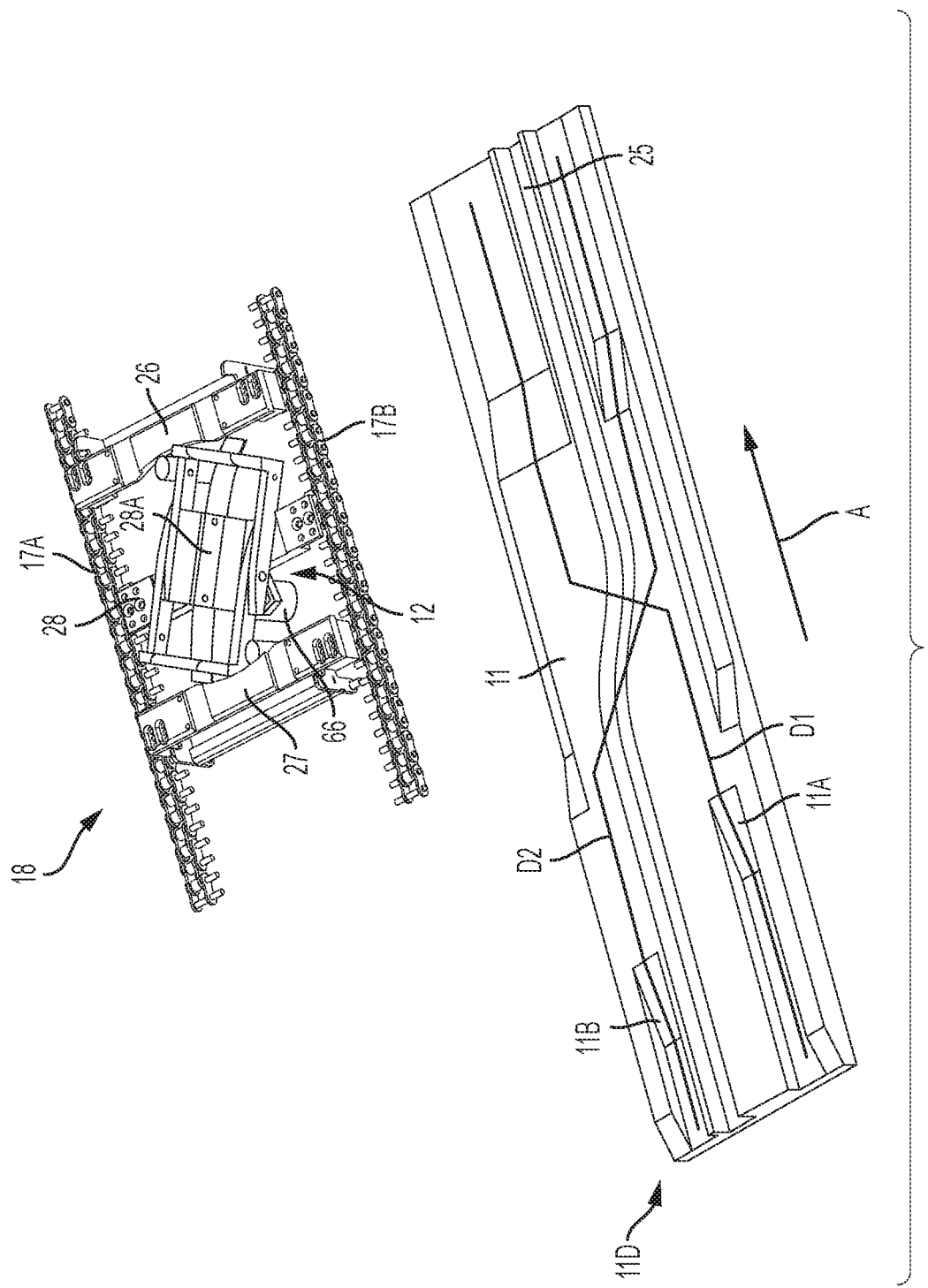
FIG. 3 is an exploded view of the conveyor chains, flight assembly and bedplate of the packaging machine of FIG. 1.
Figure 4:
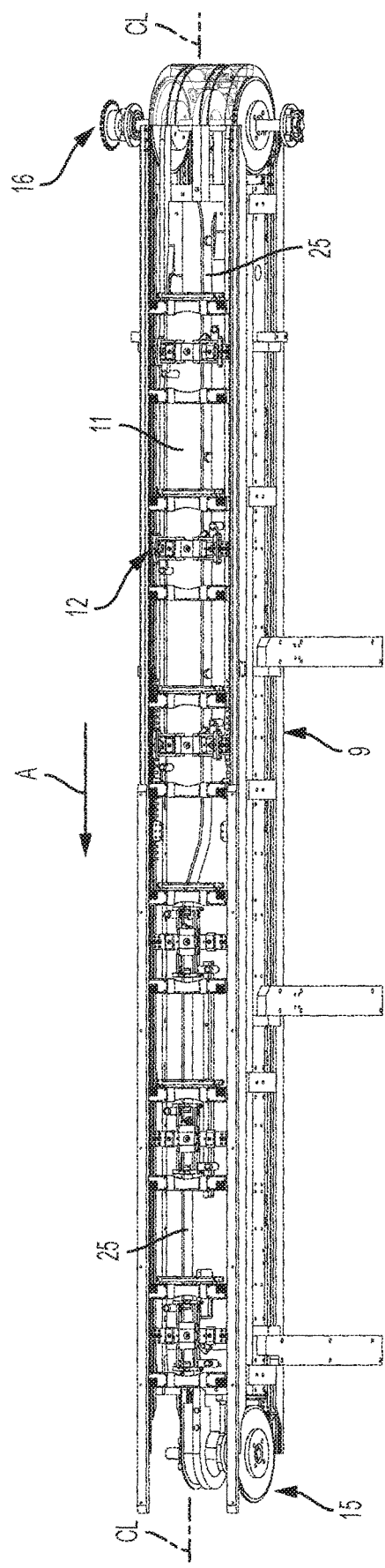
FIG. 4 is another perspective view of the packaging machine of FIG. 1.
Figure 5:
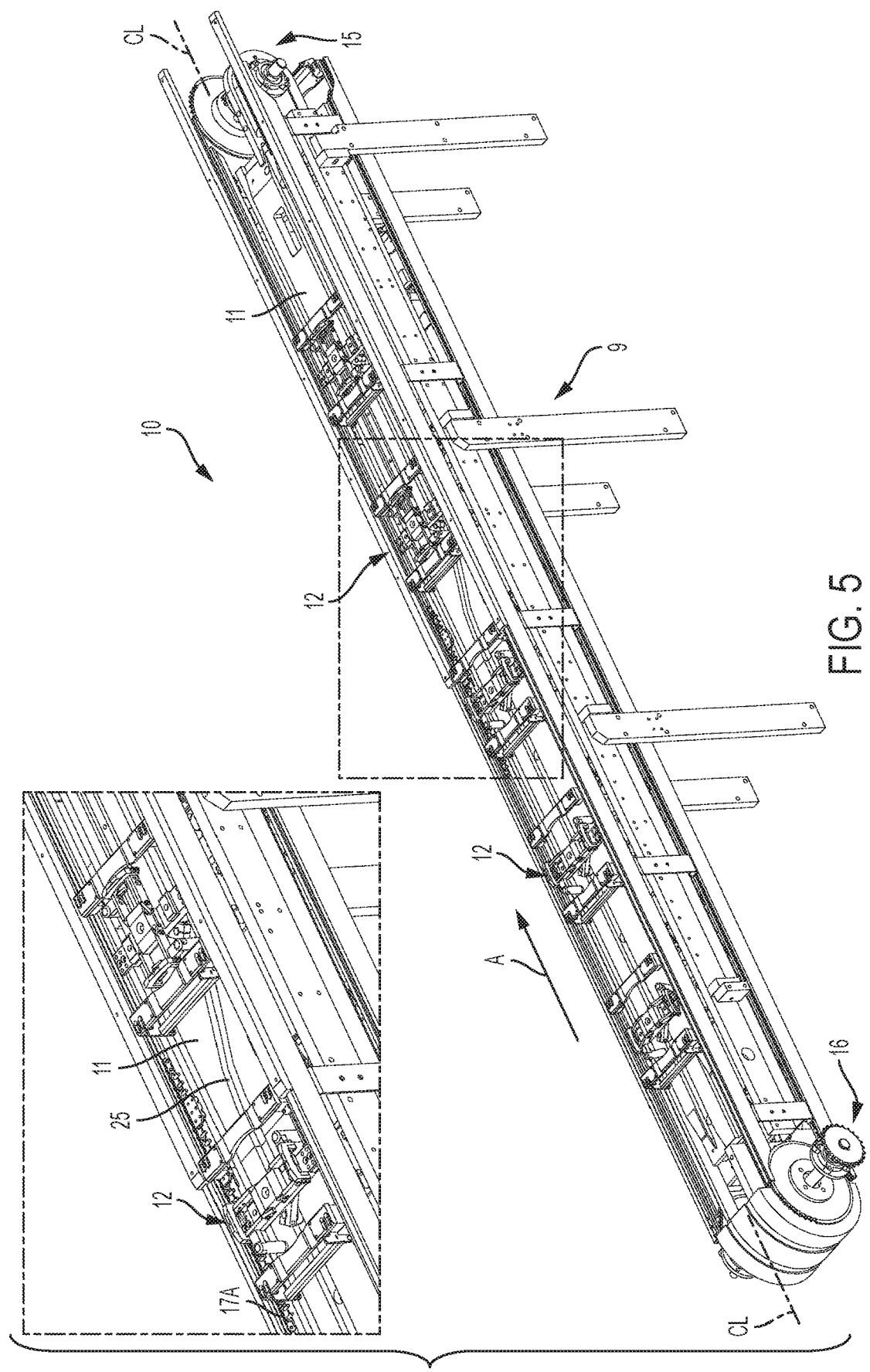
FIG. 5 is another perspective view of the packaging machine of FIG. 1, showing an enlarged view of the cam track and flight assemblies.

The surface plate 11 defines a cam track 25, FIGS. 1-4. The cam track 25 is defined left of the center line CL of plate 11 (FIGS. 3-4) beginning adjacent the tail gear 16, then extends in a straight path towards head gear assembly 15. As will be discussed herein, at the point where a portion of the flight assembly 12 rotates ninety degrees, the cam track smoothly tapers at taper section 11C across the centerline CL and then along the right side of line CL toward the head gear assembly 15. This causes the middle section of flight assembly 12 to rotate counterclockwise, as appearing from a plan view with the head gear assembly 15 to the left as shown in the view of FIG. 4, where the head gear assembly 15 is to the left and the tail gear assembly 16 is to the right.

Figure 7:
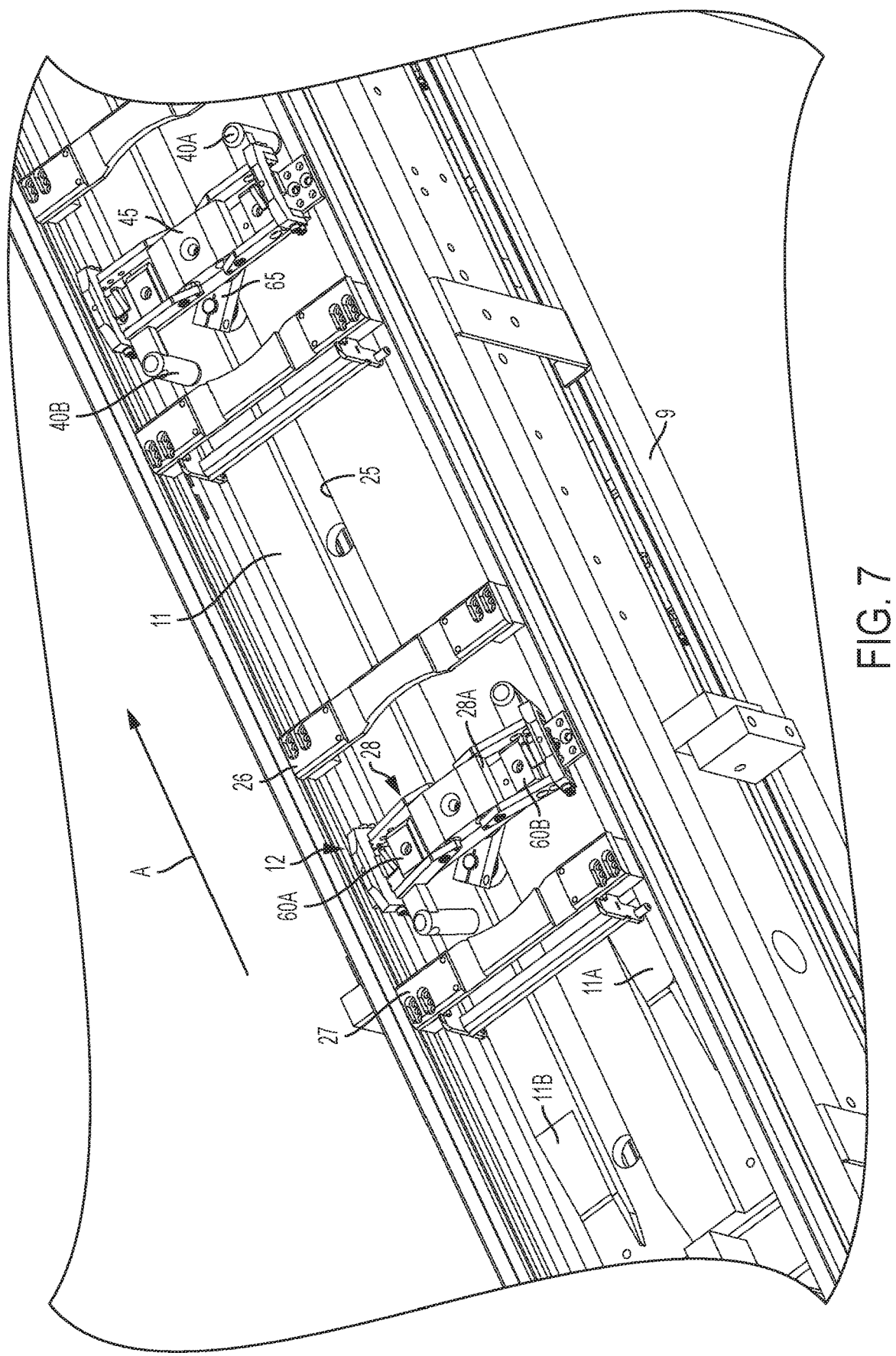
FIG. 7 is a perspective view of a portion of the packaging machine of FIG. 1.

FIG. 7 shows in plan view a portion of the packaging machine 10 with the upstream portion, that is closest to the tail gear assembly 16 to the left and the downstream portion, that is closest to the head gear assembly 15 to the right. Therefore the chain conveyor 18 moves the flight assemblies 12 in the direction of arrow A, which is the downstream direction toward head gear assembly 15.

Figure 8:
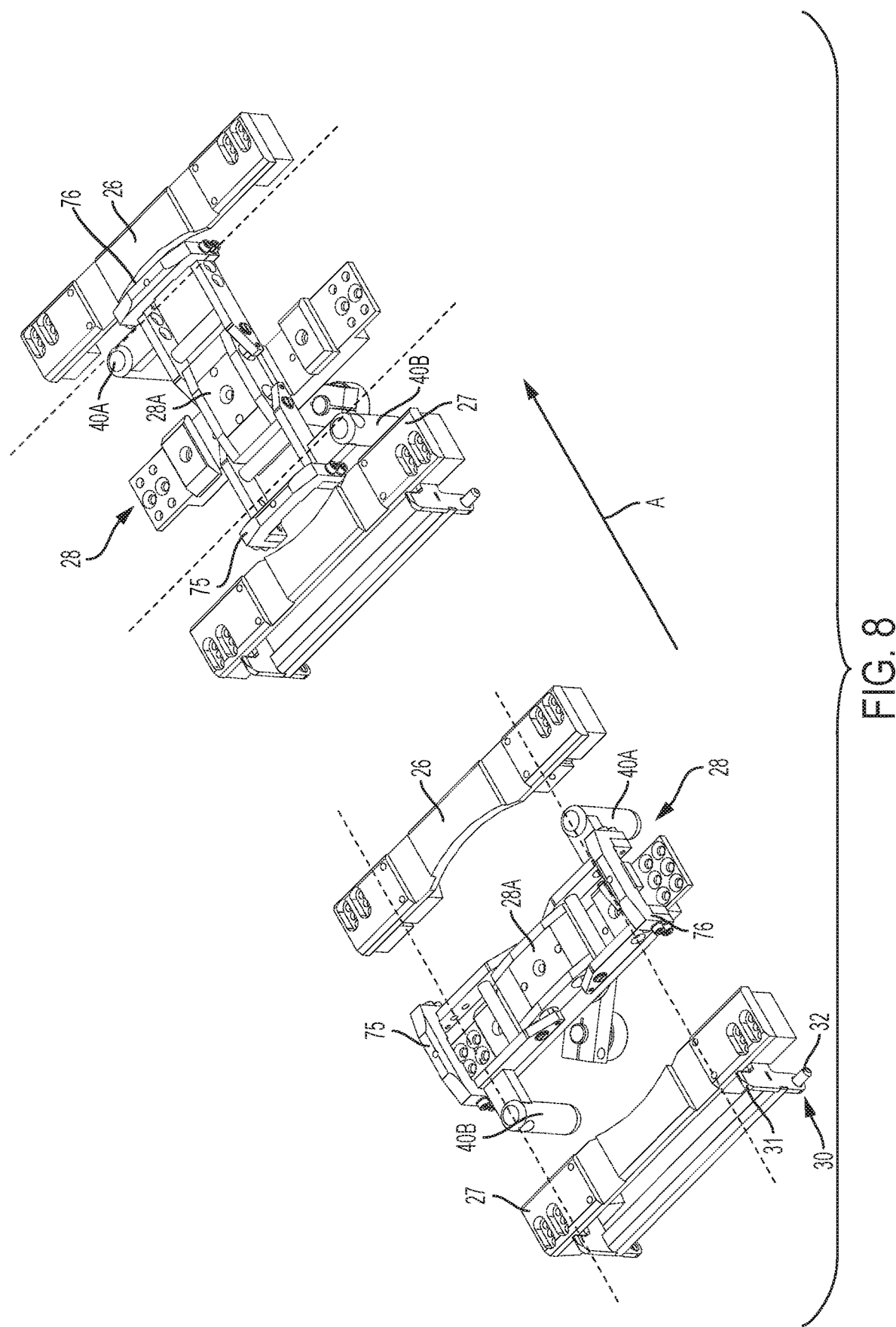
FIG. 8 shows two isolated views of the flight assembly of the present invention, with the middle support plate in different positions.

Each flight assembly is identical, and includes three support plates (FIG. 8). Leading support plate 26 and trailing support plate 27 are fixed at their opposite ends to each chain 17A and 17B, respectively, so as not to rotate, but only move along the support surface or bedplate 11 in the direction of arrow A. The middle support plate 28 having central block 28A, however, is designed to rotate ninety degrees in the counterclockwise direction at a selection position while continuously moving in the downstream direction toward head gear assembly 15, as viewed from above, for example, FIGS. 1, 7 and 8.

The leading and trailing support plates are in the form of elongate bars preferably made of plastic, nylon or other synthetic material. Any suitable, lightweight and durable material, however, can be used. The trailing support plate includes a carton registration lug 30 (FIG. 8) having a carton engaging bar 31 adapted to engage a designed cutout portion of a carton C, when placed upon the flight assembly (FIG. 17). This engagement assists the flight assembly in pushing the carton C in the downstream direction while retaining the carton on the flight assembly 12. The registration lug also includes a pin 32 that registers in a slot (not shown) running the length of the conveyor so that when the lug moves around the trailing gear assembly 16 (FIG. 19), the registration lug ultimately is moved into its raised position as shown in FIG. 8.

Figure 10:
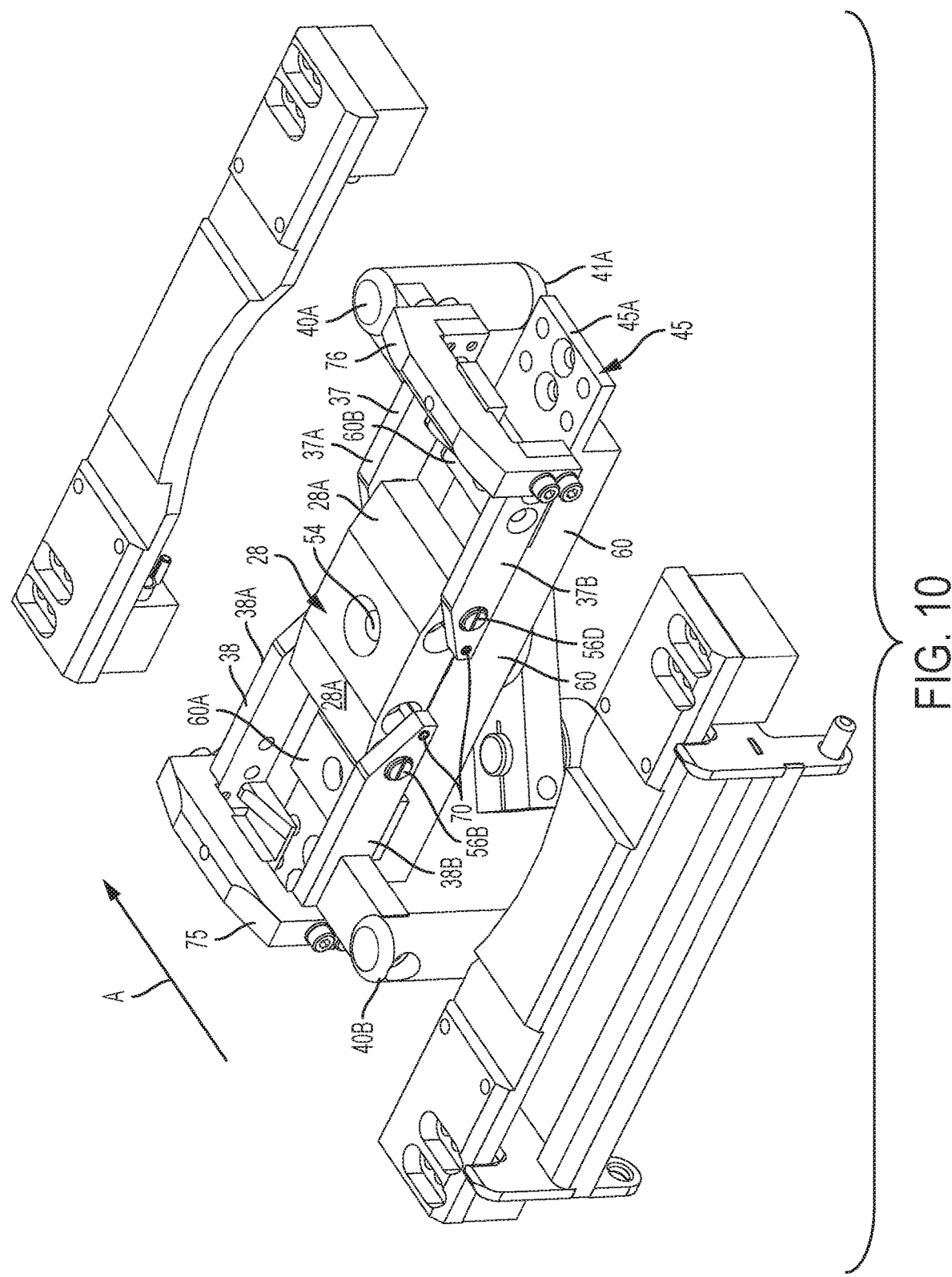
FIG. 10 is a perspective view of a single flight assembly of the present invention.

Middle support plate 28 is designed to articulate or rotate about a central, vertical axis in order to turn the carton resting on the flight assembly. Support plate 28 (FIG. 10) includes a central block or section 28A that rotates horizontally, and side brackets 37 and 38. Brackets 37 and 38 are connected to the opposing ends of central block 28A as discussed hereinafter, so as to fold or pivot upward and downward in a limited path of travel. The brackets 37 and 38 are formed in a U-shape, each opening inwardly toward block 28A, and include upstanding carton folding arms 75 and 76, respectively. Brackets 37 and 38 also include legs 37A, 37B, 38A and 38B each carry fixed pins 70 that face inwardly. Each bracket 37 and 38 includes a fixed cam rod or lug 40A and 40B, respectively, as shown in FIG. 10. The lugs each have spherical distal ends 41A and 41B that extend downwardly as the middle support plate 28 rides across or above the flat bedplate 11, in the orientation shown in FIG. 10. A support bar 45 supports block 28A.

Bar 45 is elongate and attached at each end to respective chains 17A and 17B by pins (not shown) or other suitable means at tapered end portions 45A and 45B, to move block 28A along bedplate 11 in the direction of arrow A with flights 12, and its plates 26-28. The support block 28A is not itself attached to a chain, but is allowed to pivot or rotate about central axis along with brackets 37 and 38.

Figure 11:
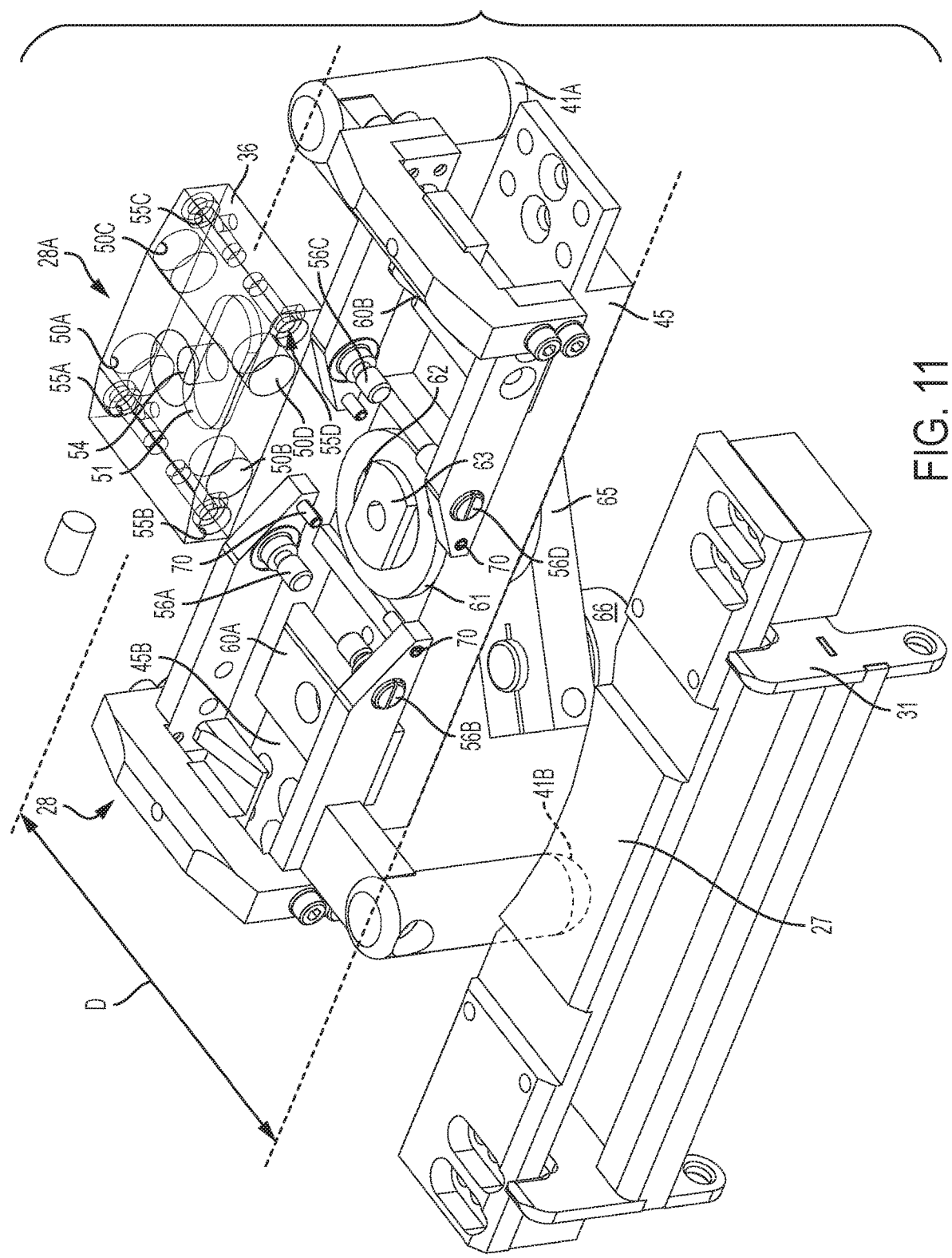
FIG. 11 is an exploded view of the single flight assembly shown in FIG. 10.
Figure 12:
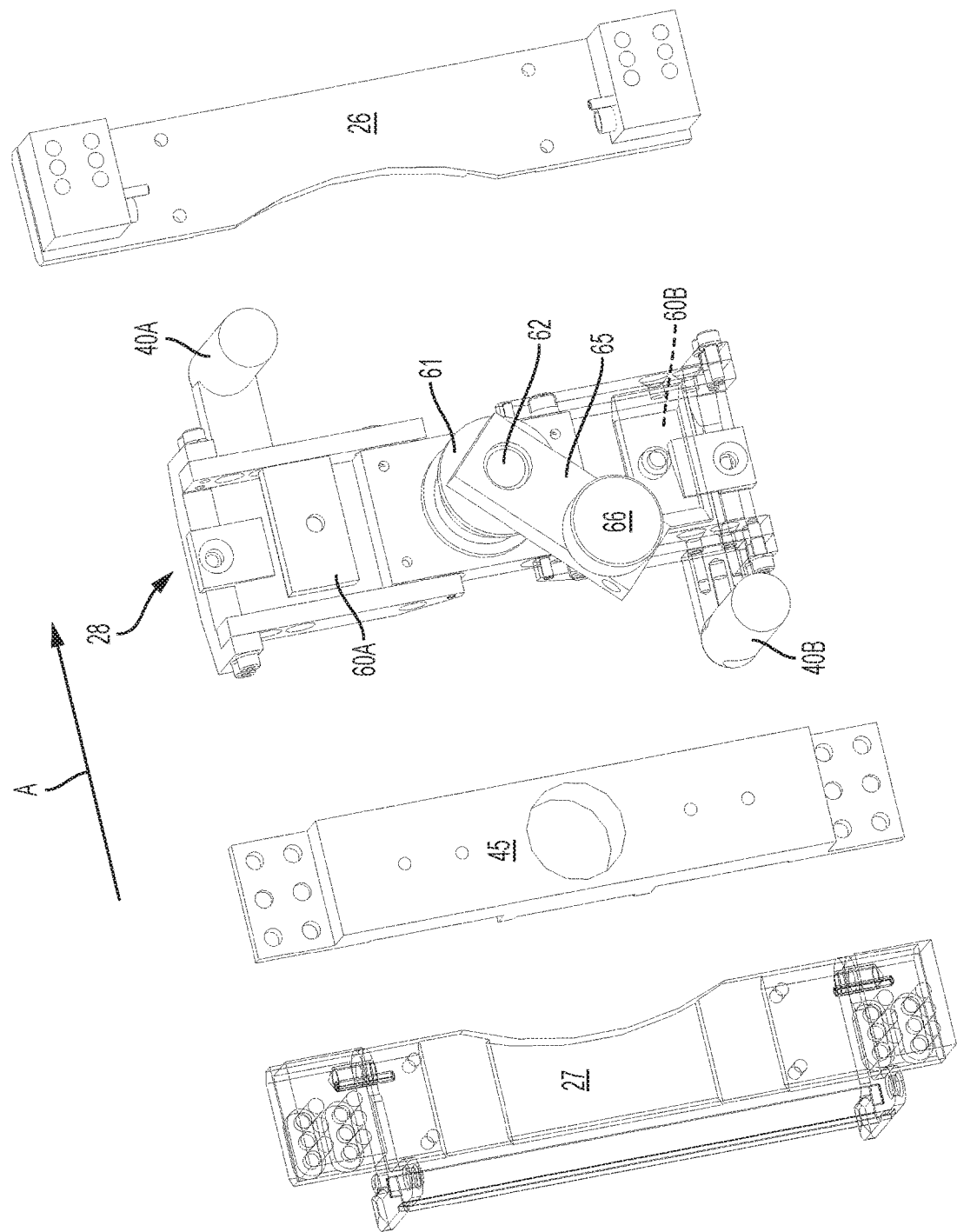
FIG. 12 is a bottom, exploded view of the single flight assembly shown in FIG. 10.

Block 28A of middle plate 28 (FIG. 11) defines laterally extending holes 50A, 50B, 50C and 50D that each receive a pin 70 from arms 37A-37D. Block 28A also defines an elongate, central, laterally extending cutout portion 51. A horizontal, central hole or open channel 54 extends through the center of block 28A at the center of cutout portion 51 as shown in FIG. 11. Block 28A also defines lateral channels 55A, 55B, 55C and 55D which receive pins 56A, 56B, 56C and 56D that extend inwardly from legs 37A, 37B, 38A and 38B, as shown in FIG. 11. Channels 50A-50D are larger, relative to the diameter of pins 70, than are channels 55A-55D are to pins 56A-56D, to allow for the limited pivoting movement of brackets 37 and 38. Block 28A is supported by cross bar 45 (FIG. 11), which is adapted to connect at either end to the respective chains 17A and 17B to move therewith. Cross bar 45 does not rotate, but supports block 28A and brackets 37 and 38 for rotation. An upstanding collar 61 extends upwardly through cross bar 45, and is adapted to carry a rod 62. Rod 62 can rotate within collar 61. The upper end of rod 62 is formed with an elongate horizontal section 63, which is sized and shaped to receive cutout portion 51 as shown in FIG. 11. A partially exploded bottom plan view of the flight assembly 12 is shown in FIG. 12. The bottom end of rod 62 is connected to a cam arm 65, which supports a round cam follower 66.

Figure 13:
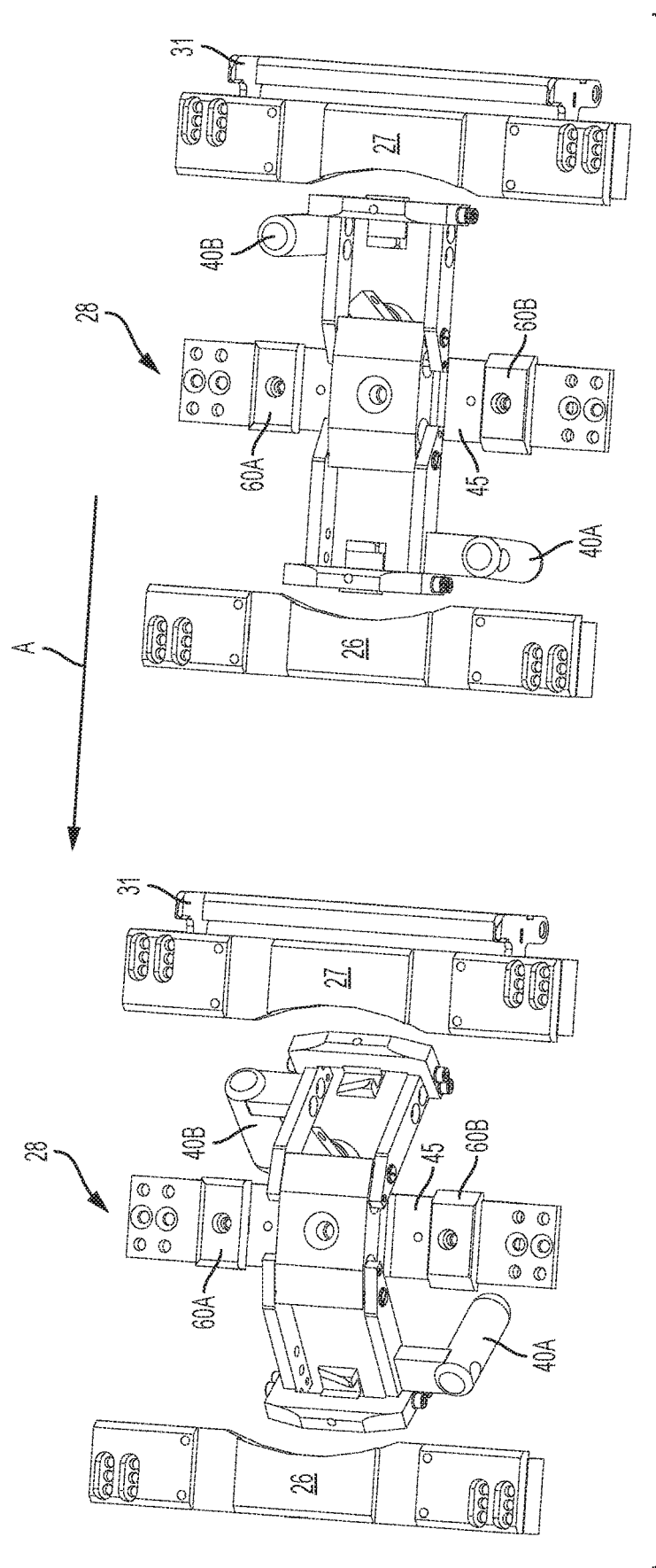
FIG. 13 shows two isolated views of the flight assembly of the present invention, with the middle support plate in angled and in flat positions, respectively.
Figure 15:
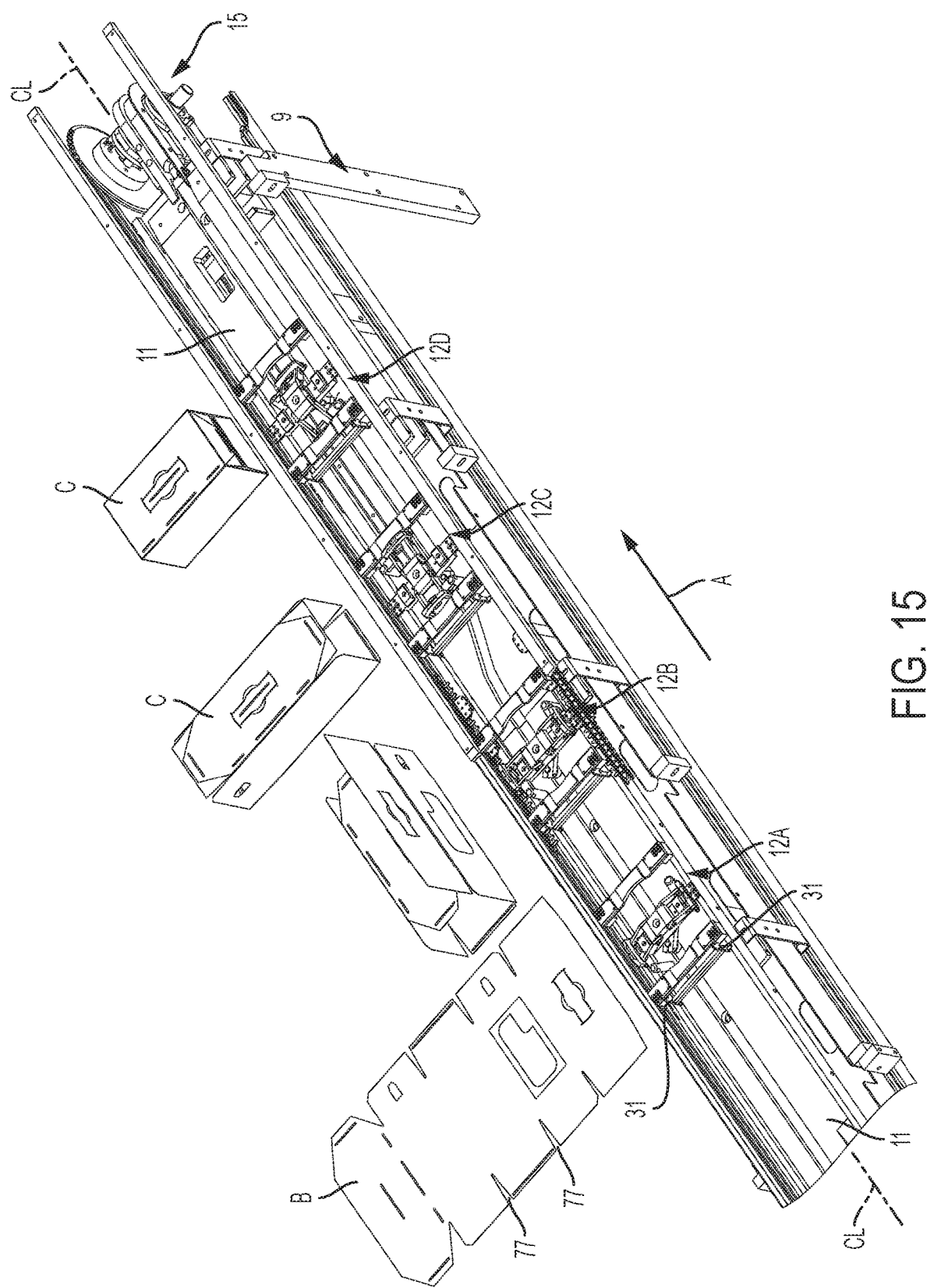
FIG. 15 shows the packaging machine of FIG. 1, with a carton blank and carton in stages of assembly, positioned over respective flight assemblies of the present invention.

FIG. 13 shows a flight assembly 12 in two different orientations of plate 28 relative to the orientations of plates 26 and 27. In the right side drawing of a flight assembly, the plates are in the upward, or flat orientation with middle plate 28 normal in orientation to both plates 26 and 27. In the left side drawing, the brackets 37 and 38 of middle plate 28 are in the downward or angled orientation, which depicts the limited pivoting the brackets. FIG. 15 shows multiple cam assemblies in four orientations along the surface plate 11. Above each assembly 12 is a carton C in the form that the carton would be if it were lying upon the respective flight assembly 12 directly below it as the carton is moved in the direction of arrow A. As shown in FIG. 15, the flight assembly of 12A is at the straight, left side portion of cam track 25. At this position, the flat carton blank is placed upon flight assembly 12A. Although not shown in FIG. 15 or 17, at this position an article group is placed upon the flat carton blank C directly above the flight assembly 12. In this position, brackets 37 and 38 of plate 28 are angled downwardly. As the carton C is placed at this position upon the flight assembly 12A, the engaging bars 31 engages slots 77 in the carton so as to push the carton downstream. At position of assembly 12B, the brackets 37 and 38 are moved upwardly by the action of lugs 40A and 40B upon plate 11, as described hereinafter, causing the upstanding arms or edges 75 and 76 to move vertically to partially close the carton around the article group.

As the flight assembly reaches the position of assembly 12C, the cam track has smoothly transitioned across centerline CL to the right hand side of plate 11 and a static plow, well known in the art, has moved the top carton panel to close around the bottle group G. At this position, however, the end flaps at each end of carton C remain open. At the position 11C (FIG. 3) where cam track 25 smoothly curves from left to right, cam follower 66 in track 25 moves cam arm 65, which in turn rotates rod or pin 62 in the counterclockwise direction. This rotation of rod 62 turns block 28A and brackets 37 and 38 of support plate 28 ninety degrees in the same direction, so that the ends of the carton, and end flaps, are positioned toward the sides of the conveyor, or normal to centerline CL. Support pads 60A and 60B (FIG. 7) on the support bar 45 hold the lugs 40A and 40B in an upward position while the block 28A and brackets 37 and 38 are rotating, so that lugs 40A and 40B do not fall into the cam track 25 but are held above it as they pass over cam track 25. Between the position of assembly 12C and assembly 12D, static tuckers and/or rotating wheels, well known in the art, move the minor carton flaps to a closed position after glue is applied to their respective inner surfaces. At least one rotating tucker wheel is found preferable in closing one end of the carton. Therefore at position 12D the carton is fully closed and ready to exit the packaging machine. FIGS. 18A-18F show the carton C being folded in a packaging machine by static tuckers, and rotated ninety degrees so that the end or minor flaps can be glued and folded by a static tucker and a rotating wheel tucker (not shown) as described above. FIGS. 9A-9D show the flight assemblies 12 in four different orientation or positions, while FIGS. 15-17 show the carton blank B and carton C, respectively, over or upon the associated flight assembly in each of these four positions.

Figure 18A:
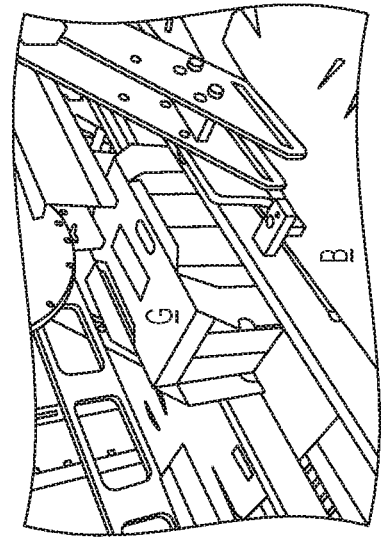
FIGS. 18A-18F are six perspective views of a carton with its end flaps being closed by a static tucker of the packaging machine of the present invention.
Figure 18B:
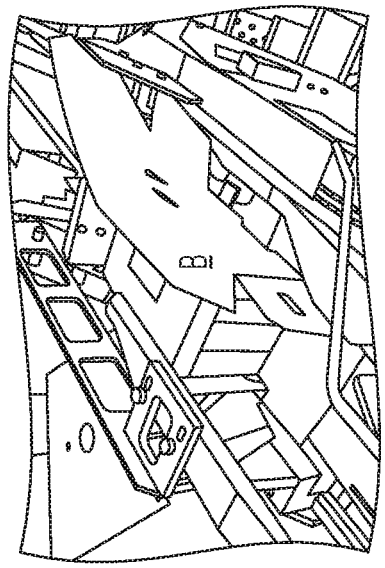
Figure 18C:
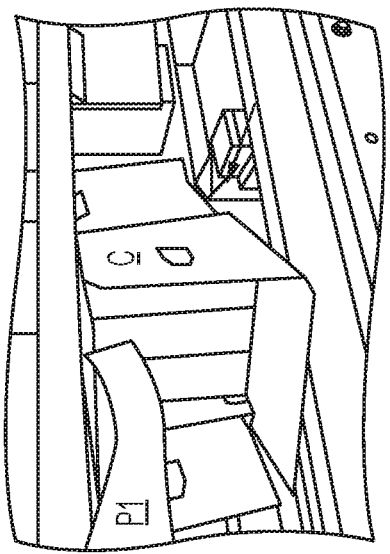
Figure 18D:
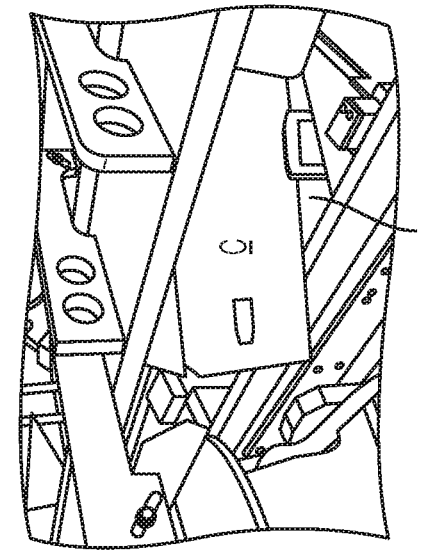
Figure 18E:
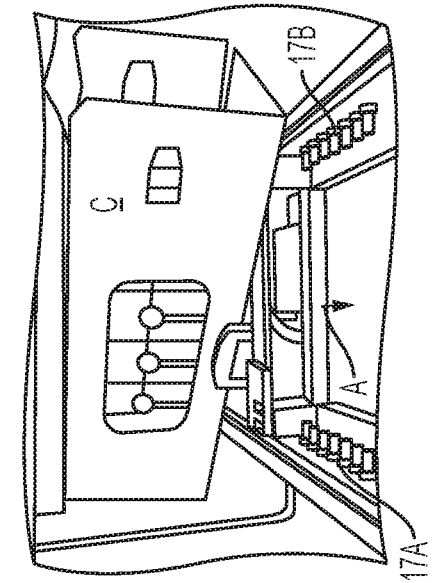
Figure 18F:
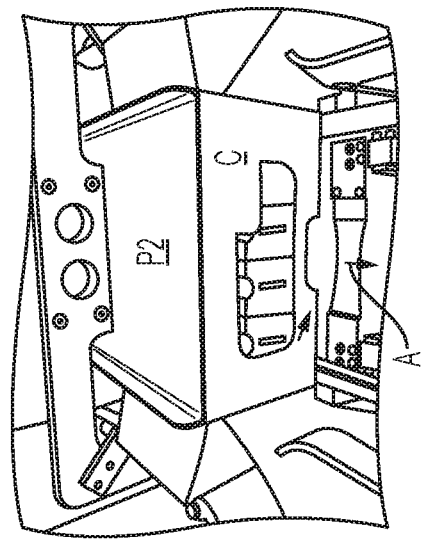

In FIG. 18A a carton blank B supports an article group G. In FIG. 18B the carton blank B is being folded up and around the article group G by static plows P. In FIG. 18C the folded carton C is being rotated to contact plow P1. FIGS. 18D and 18E show the carton in the position of FIG. 18C from different views. FIG. 18F shows the carton C fully rotated and moving under plow P2 in the direction of arrow A. An overhead pusher plate (not shown) can also be used to keep the carton square after it is rotated and being moved downstream. Such pusher plates also are well known. The end flaps are then closed and sealed, as described above, to form a fully enclosed carton of articles.

After the carton is fully sealed around the article group, the sealed carton C slides off the downstream end of the conveyor at head gear assembly 15. As this happens, the brackets 37 and 38 fall downwardly, so that arms 75 and 76 of the flight assembly 12 do not contact the carton and damage it. The pins 70 extending into the four holes 50A-50D of the central block 28A prevent the brackets 37 and 38 from falling downwardly beyond the diameter of the respective holes 50A-50D. Rather than using the pin and hole arrangement to restrict movement of the brackets 37 and 38 as they are pulled around the head gear assembly 15 and tail gear assembly 16, a spring arrangement can be used to maintain the desired movement of the brackets.

Figure 6:
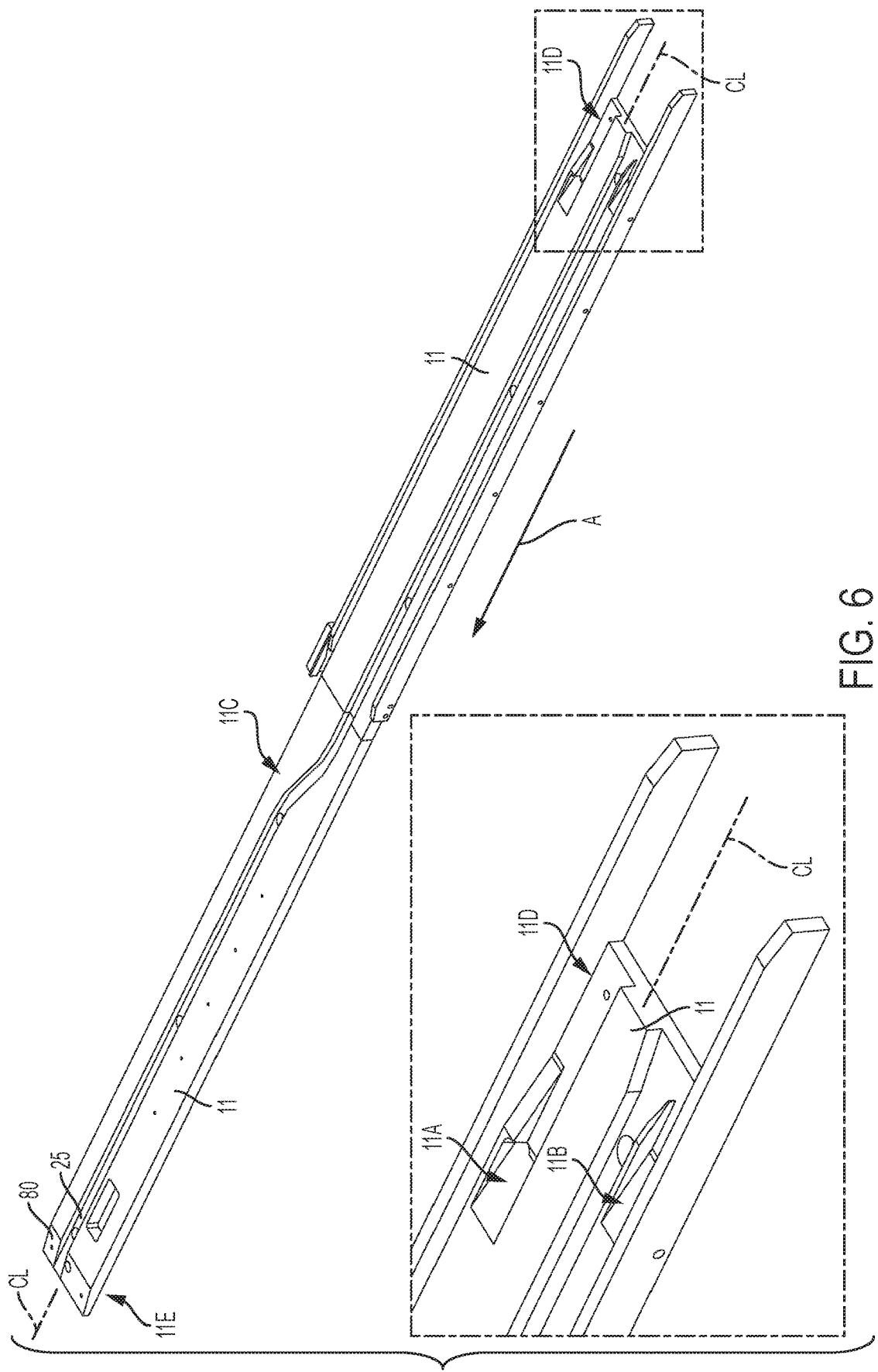
FIG. 6 is a perspective view of the bedplate and cam track of the present invention, showing an enlarged view of the transition ramps.
Figure 14:
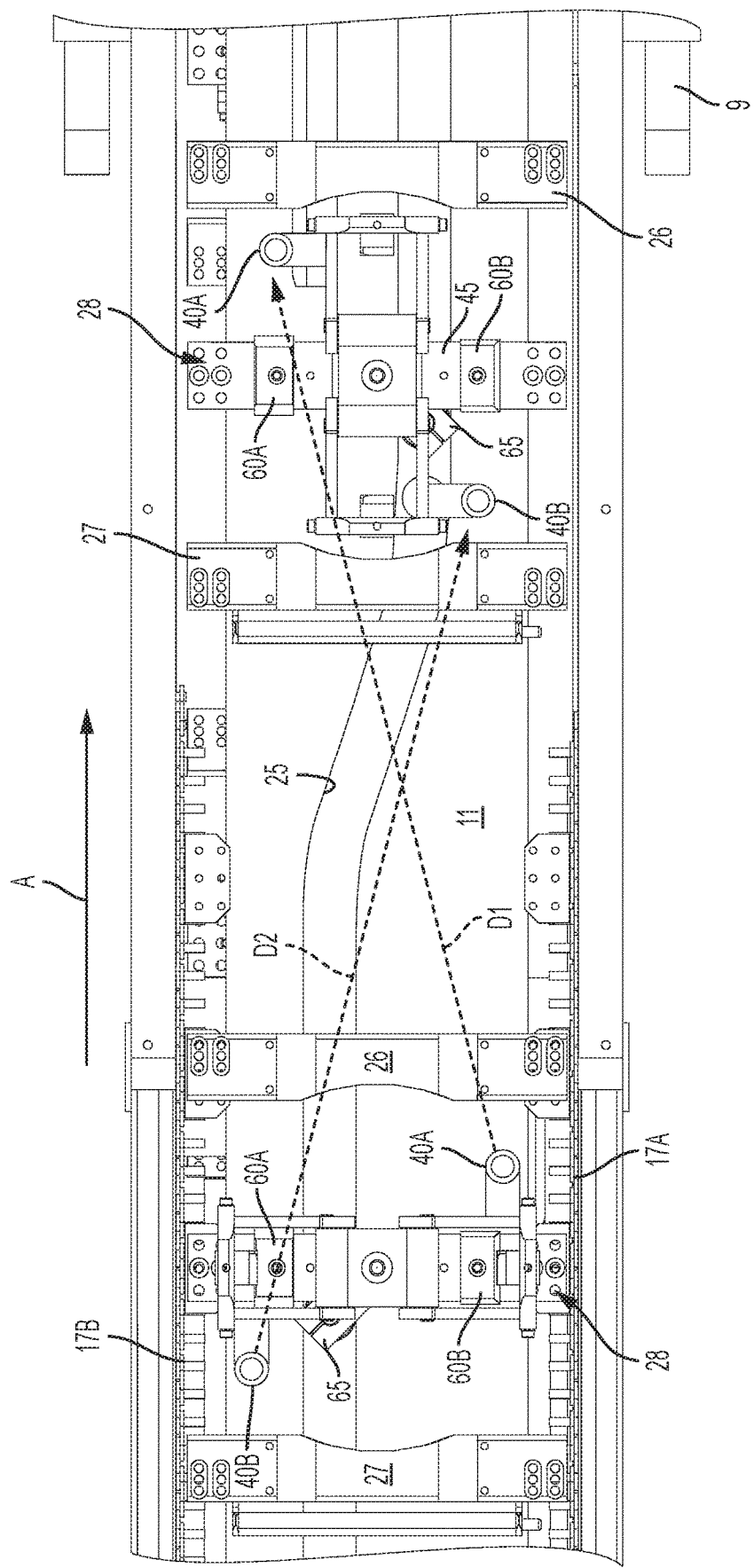
FIG. 14. is a plan view of a portion of the bedplate of the packaging machine of FIG. 1, including the cam track and two flight assemblies.

The movement of a flight assembly 12 over the bedplate 11, and across the transition section 11C of the cam track 25 is shown, for example, in FIGS. 3,5,6 and 14. FIG. 3 shows the upstream end 11D of bedplate 11 at the left side of FIG. 3. Two ramps, 11A and 11B, provide for smooth and simultaneous entry of lugs 40A and 40B onto bedplate 11. As can be seen, ramp 11A is longer than ramp 11B, though both ramps start at the end 11D of bedplate 11 at the same position. This difference in the length of ramps 11A and 11B is the same as the distance D between the midpoints of lugs 40A and 40B (FIG. 11). This difference in the lengths of ramps 11A and 11B allows the lugs to enter upon bedplate 11 simultaneously. Lug 40A transitions up ramp 11A and lug 40B transitions up ramp 11B. At the smoothly tapered section 11C of cam track 25, the lug 11A and 11B move over cam track 25, but are held above track 25 by support pads 60A and 60B, respectively. As shown in FIG. 3, lug 40A moves along path D1 while lug 40B moves along path D2. This movement of the lugs along these paths causes the support block 28A and brackets 37 and 38 to rotate in a counterclockwise direction, as described above. FIG. 3 also shows a flight assembly 12 with the block 28A and brackets 37 and 38 positioned as they are when cam 66 is in the middle of smooth transition section 11C. FIG. 6 also shows bedplate 11 that defines ramps 11A and 11B at its upstream end. At the downstream end 11E of bedplate 11 is a champhered surface 80 that allows lugs 40A and 40B to smoothly transition off of bedplate 11. Since the champhered surface is uniform in length along bedplate 11, the lugs 40A and 40B will drop off of bedplate 11 at different times, which is acceptable. Otherwise, the champhered surface 80 could be replaced with two ramps for the lugs to move off the bedplate 11. FIG. 14 shows a packaging machine 10 section with tow flight assemblies in different orientations, and paths D1 and D2, also as shown in FIG. 3, for lugs 40A and 40B.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A method of packaging an article group in a carton, the method comprises:
    obtaining a packaging machine comprising a conveyor, a bedplate positioned adjacent the conveyor, and a flight assembly at least partially supported on the bedplate, the bedplate defining a cam track, the flight assembly includes a first support plate, a second support plate downstream from the first support plate, and a third support plate positioned between the first support plate and the second support plate, the third support plate includes a cam follower, a support bar, a block rotatably supported on the support bar, and at least one bracket attached to the block, the bracket is movable between a raised position and a lowered position;
    operating the conveyor to move the flight assembly in the downstream direction,
    as the flight assembly moves in the downstream direction, engaging the cam follower in the cam track to rotate the third support plate relative to the first support plate and the second support plate.

2. The method of claim 1, wherein the at least one bracket is pivotably connected to the block.

3. The method of claim 1, wherein the cam track includes a straight section and a diverging section that diverges from the straight section, during the rotation of the third support plate, the cam follower travels through the diverging section.

4. The method of claim 3, wherein the straight section is substantially parallel to a centerline of the bedplate, and the diverging section is substantially oblique to the centerline.

5. The method of claim 4, wherein the straight section is a first straight section, the cam track comprises a second straight section, and the diverging section extends between the first straight section and the second straight section.

6. The method of claim 1, wherein the bedplate includes a ramp section.

7. The method of claim 6, wherein the third support plate further comprises a lug attached to the at least one bracket for engaging the bedplate.

8. The method of claim 7, wherein the bedplate further comprises at least one ramp, and the method further comprises transitioning the lug up the at least one ramp as the flight assembly moves in the downstream direction to move the at least one bracket from the lowered position to the raised position.

9. The method of claim 1, further comprising placing a carton blank on the flight assembly, prior to moving the flight assembly in the downstream direction.

10. The method of claim 6, further comprising placing the article group on the carton blank.

11. The method of claim 9, wherein the at least one bracket includes two brackets and the two brackets are two outer portions of the third support plate, the block is a middle portion of the third support plate, the two outer portions are operatively connected to the middle portion, when the carton blank is placed on the flight assembly the two outer portions are angled downwardly relative to the middle portion.

12. The method of claim 11, further comprising at least partially closing the blank around the article group to form an at least partially closed carton by raising the two outer portions of the third support plate.

13. The method of claim 12, wherein the rotating the third support plate rotates the at least partially closed carton 90 degrees.

14. The method of claim 13, further comprising closing end flaps of the blank to form a closed carton, after the rotating the third support plate.

15. The method of claim 14, further comprising discharging the closed carton from the flight assembly.

16. A method of packaging an article group in a carton, the method comprises:
    obtaining a packaging machine comprising a conveyor, a bedplate positioned adjacent the conveyor, and a flight assembly at least partially supported on the bedplate, the bedplate defining a cam track, the flight assembly includes a first support plate, a second support plate downstream from the first support plate, and a third support plate positioned between the first support plate and the second support plate, the third support plate includes a cam follower, wherein the third support plate includes two outer portions that are operatively connected to a middle portion;
    placing a carton blank on the flight assembly, the two outer portions are angled downwardly relative to the middle portion when the carton blank is placed on the flight assembly;
    operating the conveyor to move the flight assembly in the downstream direction, as the flight assembly moves in the downstream direction, engaging the cam follower in the cam track to rotate the third support plate relative to the first support plate and the second support plate.

17. The method of claim 16, wherein the third support plate further comprises a lug attached each outer portion for engaging the bedplate.

18. The method of claim 17, wherein the bedplate further comprises a plurality of ramps, and the method further comprises transitioning each lug up a respective ramp as the flight assembly moves in the downstream direction to move the outer portions vertically.

19. The method of claim 16, wherein each outer portion is pivotably connected to the middle portion.

* * * * *